United States Patent [19]
Hattori

[11] Patent Number: 5,677,526
[45] Date of Patent: Oct. 14, 1997

[54] REAR LIGHT DETECTION DEVICE FOR AN AUTOMATIC ANTIGLARE MIRROR

[75] Inventor: Michiaki Hattori, Fujieda, Japan

[73] Assignee: Murakami Corporation, Japan

[21] Appl. No.: 513,720

[22] Filed: Aug. 11, 1995

[30] Foreign Application Priority Data

Aug. 25, 1995 [JP] Japan ................................. 6-224062

[51] Int. Cl.$^6$ ................................................. G02B 5/08
[52] U.S. Cl. ........................... 250/206; 359/603; 359/604
[58] Field of Search ................................. 250/200, 206; 359/265, 267, 273, 601–604, 607

[56] References Cited

U.S. PATENT DOCUMENTS

| 4,542,963 | 9/1985 | Linlor | 359/603 |
| 5,253,109 | 10/1993 | O'Farrell et al. | 250/206 |
| 5,469,296 | 11/1995 | Ohno et al. | 359/604 |

FOREIGN PATENT DOCUMENTS

| A1 0067335 | 12/1982 | European Pat. Off. | 359/604 |
| A 0058529 | 4/1982 | Japan | 359/604 |
| 61-108026A | 5/1986 | Japan . | |
| 61-246720A | 11/1986 | Japan . | |

Primary Examiner—Stephone Allen
Attorney, Agent, or Firm—Hedman, Gibson & Costigan, P.C.

[57] ABSTRACT

A rear light detection device for an automatic antiglare mirror includes a variable light transmissivity layer and a reflecting film provided behind the variable light transmissivity layer. Reflectivity of the reflecting film is variably controlled by controlling the light transmissivity of the variable light transmissivity layer. The reflecting film is made of a half mirror and the device includes a light transmitting member provided behind the half mirror for collecting light which has been transmitted through the half mirror, and a photo-sensor for receiving light collected by the light transmitting member. The light transmitting member may have a concave reflecting surface and light which has been transmitted through the half mirror may be collected on the concave reflecting surface and then received by the photo-sensor. The light transmitting member may include a plurality of light receiving sections disposed at separate locations behind the half mirror and a plurality of light conducting sections for conducting light received by the light receiving sections to the photo-sensor. The light transmitting member may include a scattering surface for scattering the collected light in the vicinity of the photo-sensor.

4 Claims, 5 Drawing Sheets

REAR LIGHT DETECTION DEVICE FOR AN AUTOMATIC ANTIGLARE MIRROR

BACKGROUND OF THE INVENTION

This invention relates to a device for detecting rear light in an automatic antiglare mirror used, for example, as an inner mirror and outer mirror of a vehicle.

An electrochromic (EC) antiglare mirror is made by covering the front surface of the reflecting surface of a mirror with an EC element film and achieves an antiglare effect against light from headlights of a succeeding vehicle while running at night by changing the amount of coloration of the EC element film and thereby controlling reflectivity of the mirror. For obtaining such antiglare effect, the antiglare mirror is so controlled that, upon detection of quantity of incident light from the rear, the amount of coloration increases (i.e., reflectivity decreases) when the light from the rear is strong whereas the amount of coloration decreases (the color fades, i.e., reflectivity increases) when the light from the rear is weak.

Examples of arrangement of a rear light sensor in prior art automatic antiglare mirrors are shown in FIGS. 10A, 10B and 10C. An automatic antiglare inner mirror 10 shown in FIG. 10A has a rear light sensor 14 projecting from the rear edge of a mirror body 12. An automatic antiglare inner mirror 16 shown in FIG. 10B has a rear light sensor 14 projecting from the upper edge of a mirror body 12. An automatic antiglare mirror 18 shown in FIG. 10C has a window 22 formed through an EC film constituting a mirror reflecting surface 20 and a rear light sensor 14 provided in a mirror body 12 behind the window 22.

These automatic antiglare mirrors 10, 16 and 18 are constructed in a manner to detect rear light at only a single point in a mirror surface or a part adjacent to a mirror surface and, accordingly, tends to cause an erroneous operation in a color fading direction based on erroneous judgement that the rear light is weak in such a case that the portion where the sensor is located is momentarily in shade notwithstanding that the rear light is bright. Besides, the arrangement of the rear light sensor 14 projecting from the lower edge or upper edge of the mirror body 12 as in FIG. 10A or FIG. 10B is not only offensive to the eye but also inconvenient in that the sensor tends to detect irrelevant light notwithstanding that headlight of a succeeding vehicle is not reflected on the mirror.

It is, therefore, desirable to dispose the rear light sensor 14 in a portion within a mirror surface as in FIG. 10C. In the example of FIG. 10C, however, it becomes necessary to form, by masking or other means, an aluminum film constituting the reflecting film and the light passing window 22 in the aluminum film and the EC film and this processing complicates the process for manufacturing the mirror. Further, existence of a portion which is not the mirror in the mirror surface is not desirable for performance of the function of the mirror and also from the standpoint of design.

It is, therefore, an object of the invention to provide a rear light detection device for an automatic antiglare mirror which is capable of preventing occurrence of an erroneous operation and disposing a rear light sensor without adversely affecting the appearance of the mirror.

SUMMARY OF THE INVENTION

For achieving the above described object of the invention, there is provided a rear light detection device for an automatic antiglare mirror including a variable light transmissivity layer and a reflecting film provided behind the variable light transmissivity layer, reflectivity of the reflecting film being variably controlled by controlling the light transmissivity of the variable light transmissivity layer characterized in that said reflecting film is made of a half mirror and that said device comprises a light transmitting member provided behind the half mirror for collecting light which has been transmitted through the half mirror, and a photo-sensor for receiving light collected by the light transmitting member.

According to the invention, light incident upon a range of a relatively broad expanse of the mirror surface is collected and received by the photo-sensor and, therefore, in a case where a shaded portion is produced on the mirror surface, incident light can be received in other portion of the mirror whereby a state wherein no light is received on the mirror surface at all can be avoided and an erroneous operation caused by such state can be avoided. Further, according to the invention, the number of photo-sensors can be reduced as compared with a case where photo-sensors are provided at several different locations on the mirror surface and, therefore, an electrical circuit for processing light received by these photo-sensors can be simplified. Further, when rear light is transmitted through a half mirror, light quantity is generally reduced but, according to the invention, rear light is collected and projected on the photo-sensor and, accordingly, decrease in sensitivity can be prevented. Further, since the half mirror is employed, there is no portion which is not a part of the mirror as in the case where a window is formed in a part of the mirror and this avoids an adverse effect in design and complexity in the manufacturing process. Furthermore, since rear light is received within the mirror surface, there is no likelihood of receiving irrelevant outside light. Furthermore, since the photo-sensor does not project outside of the mirror body, the photo-sensor is not likely to become offensive to the eye.

In one aspect of the invention, the light transmitting member has a concave reflecting surface and the light which has been transmitted through the half mirror is collected on the concave reflecting surface and then received by the photo-sensor.

According to this aspect of the invention, since rear light is collected on the concave reflecting surface, rear light can be effectively collected and an excellent sensitivity can thereby be obtained.

In another aspect of the invention, the light transmitting member comprises a plurality of light receiving sections disposed at separate locations behind the half mirror and a plurality of light conducting sections for conducting light received by the light receiving sections to the photo-sensor.

According to this aspect of the invention, light incident upon specific locations in all incident light can be selectively collected and transmitted to the photo-sensor.

In still another aspect of the invention, the light transmitting member comprises a scattering surface for scattering the collected light in the vicinity of the photo-sensor.

According to this aspect of the invention, since the collected light can be scattered in the vicinity of the photo-sensor and then received by the photo-sensor, light incident at different parts in the mirror surface can be uniformly transmitted to the photo-sensor.

Preferred embodiments of the invention will be described below with reference to the accompanying drawings.

BRIEF DESCRIPTION OF THE DRAWINGS

In the accompanying drawings.

DESCRIPTION OF PREFERRED EMBODIMENTS

Embodiment 1

Figure 1:
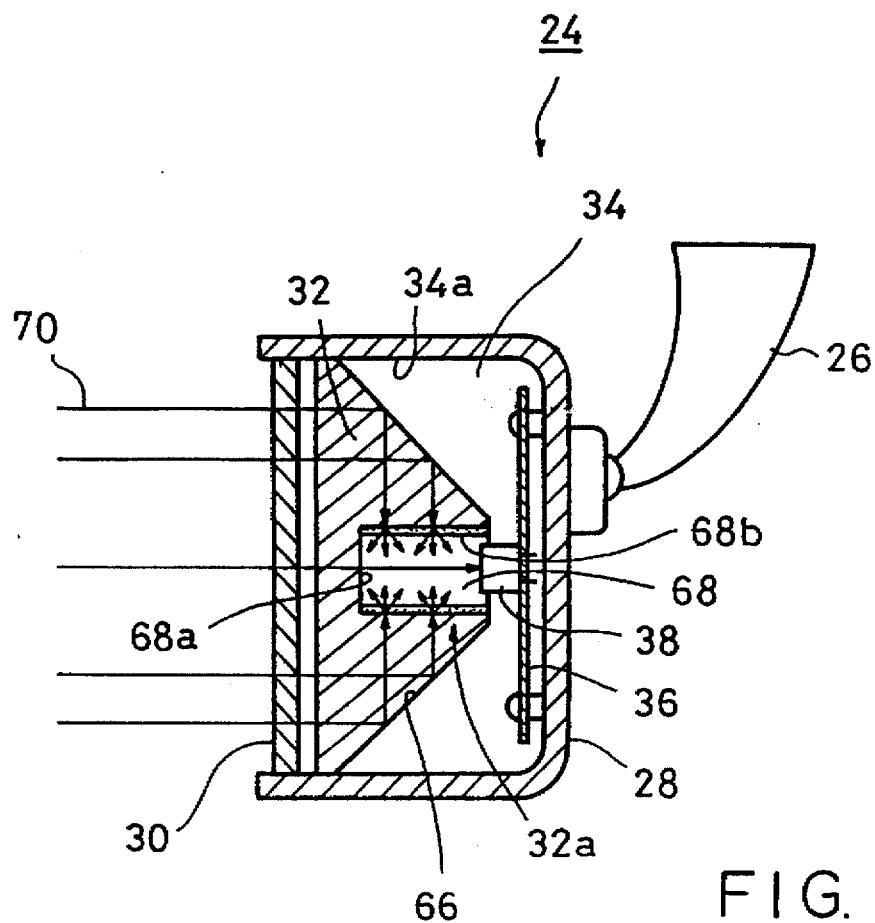
FIG. 1 showing a first embodiment of the invention is a sectional view taken along arrows A—A of FIG. 2 which shows an inner mirror.
Figure 2:
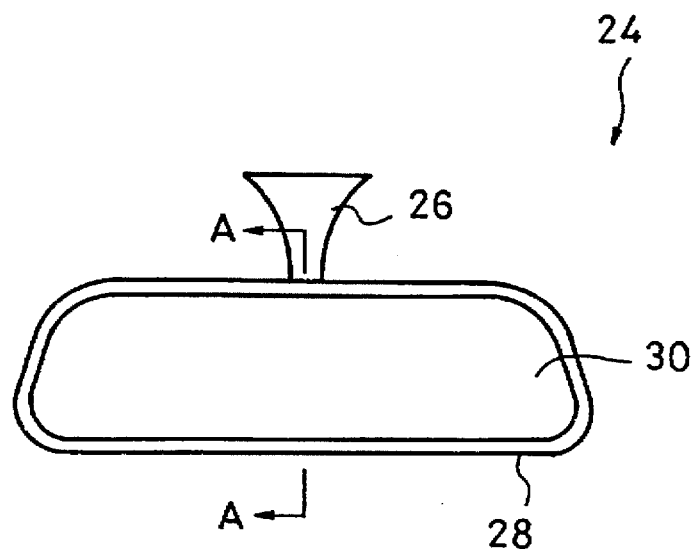
FIG. 2 is a front view showing the first embodiment.

FIG. 2 is a front view showing a preferred embodiment of the invention and FIG. 1 is a perspective sectional view of the embodiment taken along arrows A—A in FIG. 2. An automatic antiglare EC inner mirror 24 has a mirror housing (mirror body) 28 which is pivotably connected to a stay 26. In the front opening of the mirror housing 28 is fitted an EC mirror 30 which constitutes a half mirror. In an inner space 34 of the mirror housing 28 behind the EC mirror 30 is fixed a light transmitting member 32 made of transparent glass or transparent resin in such a manner that the peripheral portion of the light transmitting member 32 is fitted in an inner wall surface 34a of the mirror housing 28. To a portion of the mirror housing 28 behind the light transmitting member 32 is fixed an electronic circuit substrate 36 by means of screws or the like fastening means. A photo-sensor 38 (rear light sensor) is secured to the central portion of the electronic circuit substrate 36 with its light receiving surface facing the direction normal to the surface of the EC mirror 30.

Figure 3A:
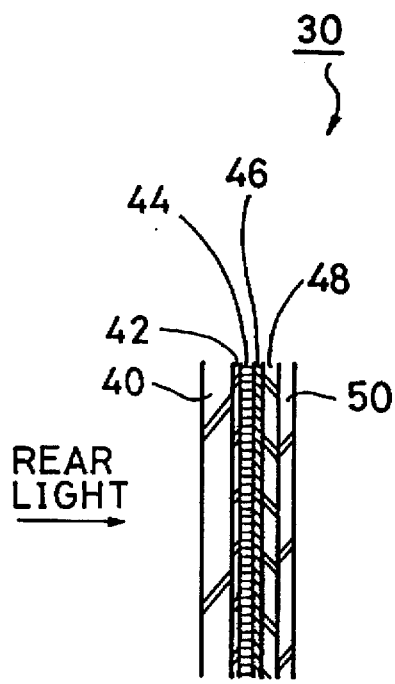
FIGS. 3A and 3B are enlarged sectional views of the EC mirror shown in FIG. 1.
Figure 3B:
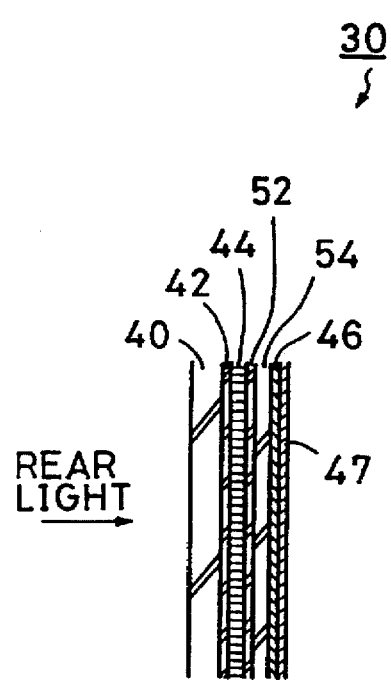

In a case where the EC mirror 30 is made of a solid EC, the EC mirror 30 is composed, as shown in FIG. 3A, of transparent glass 40, ITO transparent electrode film 42, EC layer 44, aluminum reflecting electrode film (half mirror) 46, transparent sealing resin 48 and transparent sealing glass 50 as viewed from the front surface side. In a case where the EC mirror 30 is made of a liquid EC, the EC mirror 30 is composed, as shown in FIG. 3B, of transparent glass 40, ITO transparent electrode film 42, EC layer 44, ITO transparent electrode film 52, transparent glass 54, aluminum reflecting film (half mirror) 46 and aluminum protecting film 47 as viewed from the front surface side.

The higher the light transmissivity of the aluminum reflecting film 46, the more advantageous it is for detecting rear light but reflectivity thereof as a mirror is deteriorated. For ensuring sufficient reflectivity as a mirror, reflectivity of the mirror at the color fading time (i.e., when reflectivity is high) should be at least 40%. Besides, considering that transmissivity (or reflectivity) and light absorption property of the EC layer 44 and the half mirror 46 differ depending upon the film structure and irregularity of these films, light transmissivity of the aluminum reflecting film 46 should properly be about 40% to 10%. The reflectivity of the mirror at this time is expected to be about 43–66% at the color fading time and about 7–10% at the color imparting time.

Figure 4:
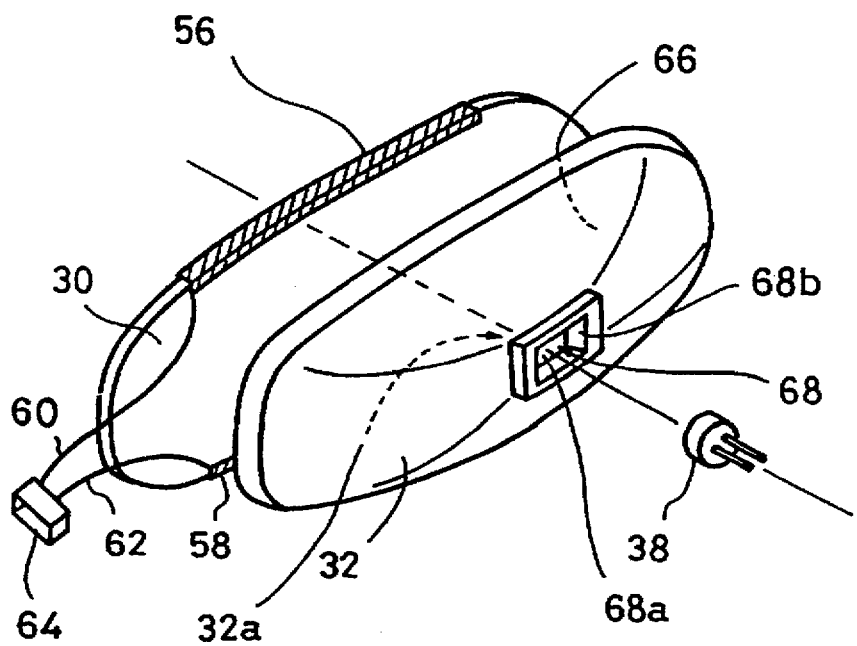
FIG. 4 is an exploded perspective view showing the internal structure of the inner mirror of FIG. 1.
Figure 5:
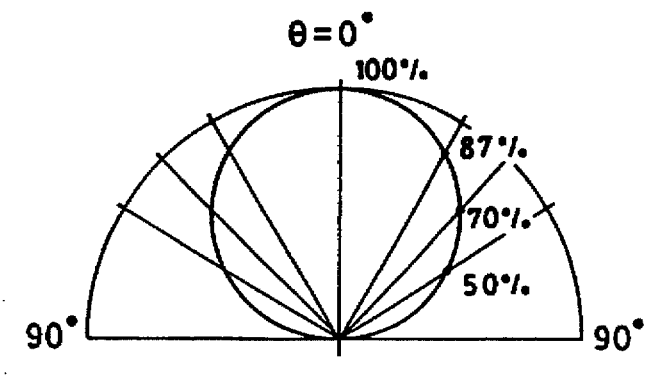
FIG. 5 is a diagram showing a sensitivity curve of CdS.

FIG. 4 is an exploded perspective view showing the EC mirror 30, light transmitting member 32 and photosensor 38. The EC mirror 30 is provided at its upper and lower edge portions with clip electrodes 56 and 58. Connection lines 60 and 62 connect the clip electrodes 56 and 58 with a connector 64. The light emitting member 32 is made of transparent glass or transparent resin in a convex shape in such a manner that the entire member 32 is received in the mirror housing 28. A concave reflecting surface 66 formed by employing a prism system is provided on the inner surface of the convex light transmitting member 32. The top portion 32a of the convex light transmitting member 32 constitutes a light collecting portion and a recess 68 is formed in this light collecting portion. An inner wall surface 68b of the recess 68 excepting a bottom surface 68a is provided with small projections and depressions and thereby is formed as a light scattering surface. The photo-sensor 38 is secured on the electronic circuit substrate 36 (FIG. 1) in a manner to face the recess 68 of the light transmitting member 32. The photo-sensor 38 is made, for example, of CdS. In case CdS is used for the photo-sensor 38, the sensitivity curve of the photo-sensor 38 becomes, as shown in FIG. 5, a curve of cos θ with the front direction of the light receiving surface being θ=0°. The direction of θ=0° is set at a substantially normal direction to the surface of the EC mirror 30. The photo-sensor 38 may be made of a light receiving element other than CdS.

The operation for receiving rear light by the inner mirror 24 of the above described structure will now be described with reference to FIG. 1. When rear light 70 such as headlight of a succeeding vehicle is incident from the rear of the vehicle, the EC mirror (half mirror) 30 reflects a part of the incident rear light 70, absorbs another part of the incident rear light 70 by the EC layer and transmits the remainder to the light transmitting member 32. The light transmitting member 32 reflects the incident light upon the convex reflecting surface 66 and thereby collects the incident light in the central portion of the light transmitting member 32 and projects the collected light on the scattering surface 68b formed on the inner surface of the recess 68. The scattering surface 68b thereby shines and the photo-sensor 38 receives the scattered light and outputs it as a rear light detection signal. This signal is used for color-controlling of the EC layer 44. The incident light from the central portion of the EC mirror 30 advances straight, passing through the bottom surface 68a of the recess 68 (non-scattering surface), and is received by the photo-sensor 38.

Therefore, according to the inner mirror 24 of this embodiment, the rear light 70 incident upon a range of a relatively broad expanse of the mirror surface of the EC mirror 30 is collected on the concave reflecting surface 66 and received by the photo-sensor 38. Therefore, even if a shaded portion is produced in a part of the mirror surface, light incident upon other portion of the mirror surface can be received whereby a state wherein no light is received at all can be avoided and an erroneous operation caused by such state can be avoided. Further, since the rear light 70 is collected and projected on the photo-sensor 38, decrease in the light quantity due to the use of the half mirror 30 can be compensated and drop in sensitivity can thereby be prevented. In this embodiment, particularly, the rear light 70 is collected on the concave reflecting surface 66, the rear light 70 can be effectively collected and an excellent sensitivity can thereby be obtained. Further, since light collected on the reflecting surface 66 is scattered on the scattering surface 66b in the vicinity of the photo-sensor 38 and is received by the photo-sensor 38, light incident from various sections of the mirror surface can be uniformly transmitted to the photo-sensor 38. Furthermore, since the light incident from the central portion of the EC mirror 30 (i.e., the most glaring light) is received without being scattered, the highest sensitivity is attained for this light and an excellent antiglare effect thereby can be obtained.

In addition, since the half mirror is employed, it is not necessary to provide a window in a part of the EC mirror 30 so that there is no likelihood of inconvenience in the design or complexity in the manufacturing process. Further, since the rear light 70 is received in the mirror surface, there is no likelihood of detecting irrelevant light. Since the photo-sensor 38 does not project from the periphery of the mirror housing 28, existence of the photo-sensor does not become offensive to the eye. Further, since the photo-sensor 38 is provided on the electronic circuit substrate 36, even if the shape of the mirror is changed, such change can be coped with by forming the light transmitting member 32 so that the light collecting portion 32a of the light transmitting member 32 will be provided at a location where the light collecting portion 32a faces the photo-sensor 38 and, accordingly, a common electronic circuit substrate 36 can be employed notwithstanding difference in the shape of the mirror.

Figure 6:
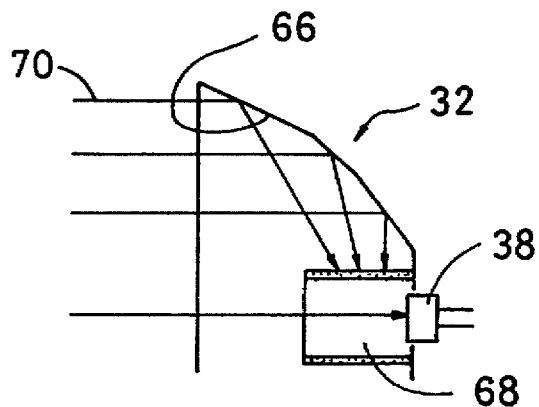
FIG. 6 is a sectional view showing another example of the shape of the reflecting surface of a light transmitting member 32 of FIG. 1.
Figure 7:
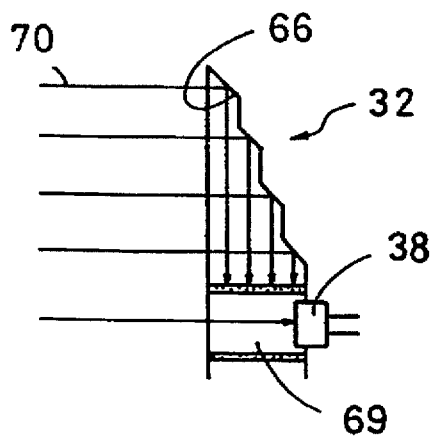
FIG. 7 is a sectional view showing still another example of the shape of the reflecting surface of the light transmitting member 32 of FIG. 1.

The light transmitting member 32 is not limited to the one having the reflecting surface 66 of a flat inclined surface but the reflecting surface 66 may be of a curved inclined surface as shown in FIG. 6 or a stepwise inclined surface as shown in FIG. 7. As shown in FIG. 7, the recess 68 may be replaced by a through-hole 69. In the above described embodiment, a prism system is used as the light transmitting member 32. Alternatively, the light transmitting member 32 may be formed by a reflecting mirror having the concave reflecting surface 66 or a condensing lens (a convex lens).

Embodiment 2

Figure 8:
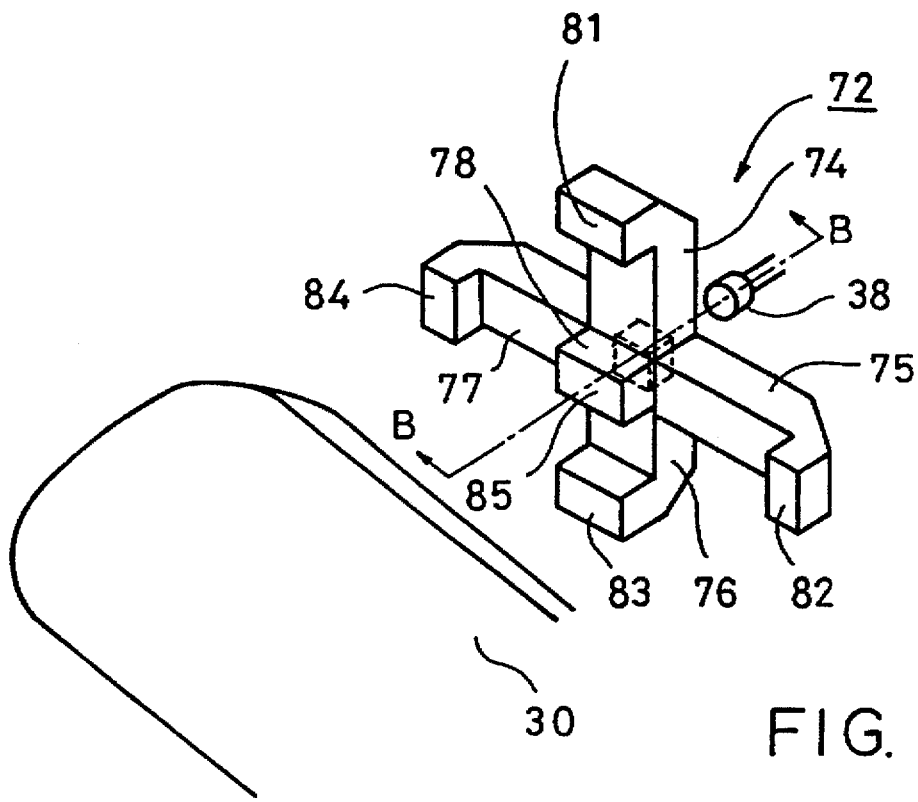
FIG. 8 is an exploded perspective view showing the internal structure of an inner mirror which constitutes a second embodiment of the invention.
Figure 9:
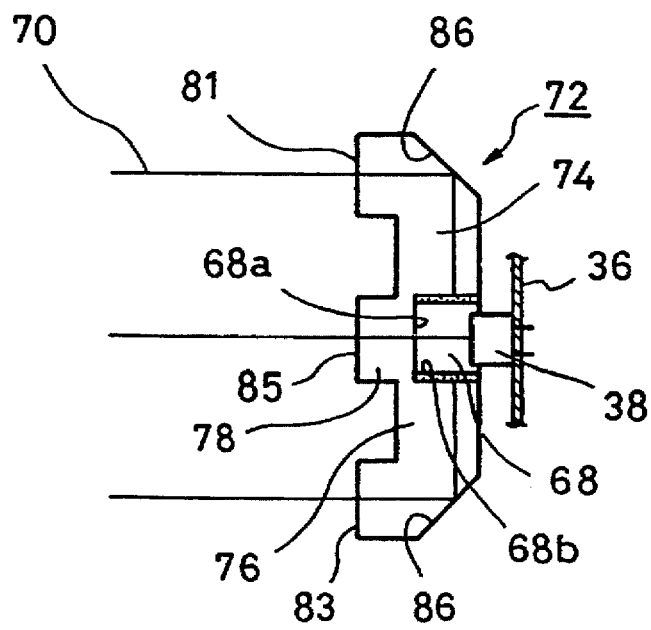
FIG. 9 is a sectional view taken along arrows B—B in FIG. 8.
Figure 10A:
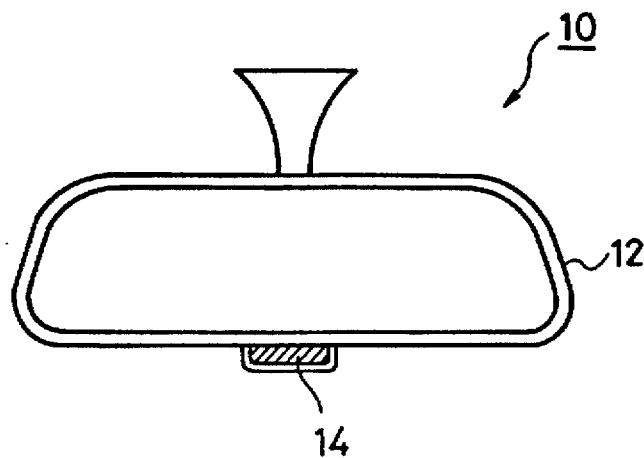
FIGS. 10A, 10B and 10C are front views showing arrangements of a rear light sensor for an automatic antiglare mirror employed in the prior art devices.
Figure 10B:
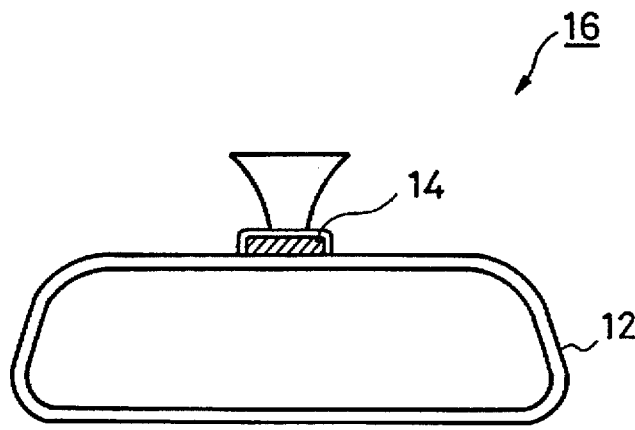
Figure 10C:
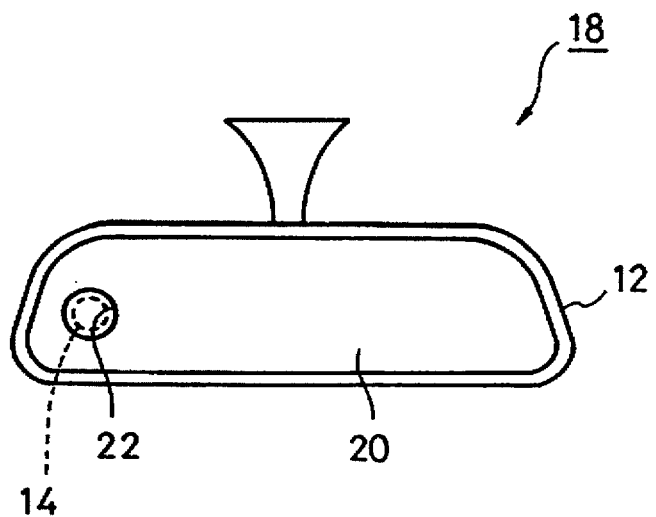

Another embodiment of the invention will be described with reference to FIGS. 8 and 9. In FIG. 8, a light transmitting member 72 is constructed in a manner to receive light not from the entire mirror surface of the EC mirror 30 but from specific plural parts (five parts in this embodiment) of the mirror surface. The light transmitting member 72 is made of transparent resin or transparent glass and has radially disposed four light conducting sections 74–77 and one light conducting section 78 projecting in the central portion of the light transmitting member 72, all these light conducting sections being formed integrally. As shown in FIG. 9 which is a view taken along arrows B—B in FIG. 8, a recess 68 is formed in the central rear portion of the light transmitting member 72 and the light receiving surface of the photo-sensor 38 provided on the electronic circuit substrate 36 is disposed adjacent to the recess 68. An inner surface 68b excluding a bottom surface 68a of the recess 68 is formed as a light scattering surface.

End surfaces of the respective light conducting sections 74–78 constitute light receiving sections 81–85. Rear light 70 incident upon the light receiving sections 81–84 is collected by being reflected by a reflecting surface 86 and then scattered by a scattering surface 68b in the recess 68 and received by the photosensor 38. Rear light incident upon the light receiving section 85 advances straight, passing through the bottom surface 68a (non-scattering surface) of the recess 68 and is received by the photo-sensor 38. According to this embodiment, light incident specific parts in the rear light 70 incident upon the EC mirror 30 can be selectively collected and transmitted to the photosensor 38.

Instead of providing the light transmitting member 72 of FIG. 8, plurality of optical fibers may be radially disposed in a similar manner to the embodiment of FIG. 8 with one end portions of the optical fibers facing the light receiving direction and the other end portions being bound together and facing the light receiving surface of the photo-sensor 38.

In the above described embodiments, the invention has been applied to the inner mirror. The invention may also be applied to an outer mirror (e.g., door mirror or fender mirror).

What is claimed is:

1. A rear light detection device for an automatic antiglare mirror including a variable light transmissivity layer and a reflecting film provided behind the variable light transmissivity layer, reflectivity of the reflecting film being variably controlled by controlling the light transmissivity of the variable light transmissivity layer CHARACTERIZED IN THAT said reflecting film is made of a half mirror and THAT said device comprises a light transmitting member provided behind the half mirror for collecting light which has been transmitted through the half mirror, and a photo-sensor for receiving light collected by the light transmitting member.

2. A rear light detection device as defined in claim 1 wherein said light transmitting member has a concave reflecting surface and the light which has been transmitted through the half mirror is collected on the concave reflecting surface and then received by the photo-sensor.

3. A rear light detection device as defined in claim 1 wherein said light transmitting member comprises a plurality of light receiving sections disposed at separate locations behind the half mirror and a plurality of light conducting sections for conducting light received by the light receiving sections to the photo-sensor.

4. A rear light detection device as defined in claim 1 wherein said light transmitting member comprises a scattering surface for scattering the collected light in the vicinity of the photo-sensor.

* * * * *